US007227745B2

(12) United States Patent
Kowalkowski et al.

(10) Patent No.: US 7,227,745 B2
(45) Date of Patent: Jun. 5, 2007

(54) CAGELESS, PLUGGABLE OPTOELECTRONIC DEVICE

(75) Inventors: Anthony S. Kowalkowski, Chicago, IL (US); Bruce Peterson, Schaumburg, IL (US)

(73) Assignee: Stratos International, Inc., Chicago, IL (US)

( * ) Notice: Subject to any disclaimer, the term of this patent is extended or adjusted under 35 U.S.C. 154(b) by 42 days.

(21) Appl. No.: 11/234,575

(22) Filed: Sep. 23, 2005

(65) Prior Publication Data
US 2007/0081310 A1    Apr. 12, 2007

(51) Int. Cl.
*H02B 1/26* (2006.01)

(52) U.S. Cl. .............. 361/685; 361/752; 361/753; 439/92; 439/372; 439/607; 385/88; 385/89; 385/92

(58) Field of Classification Search ........... 361/685, 361/688, 729, 730, 736, 740, 747, 816, 818; 174/32, 350; 439/497, 372, 92, 76.1, 607; 385/92, 88
See application file for complete search history.

(56) References Cited

U.S. PATENT DOCUMENTS

| | | | | |
|---|---|---|---|---|
| 3,208,781 | A * | 9/1965 | Appleberry | 292/128 |
| 5,176,538 | A * | 1/1993 | Hansell et al. | 439/607 |
| 5,717,533 | A | 2/1998 | Poplawski et al. | 361/752 |
| 5,734,558 | A | 3/1998 | Poplawski et al. | 361/752 |
| 5,812,582 | A | 9/1998 | Gilliland et al. | 372/50 |
| 5,812,717 | A | 9/1998 | Gilliland | 385/93 |
| 5,864,468 | A | 1/1999 | Poplawski et al. | 361/753 |
| 5,879,173 | A | 3/1999 | Poplawski et al. | 438/138 |
| RE36,491 | E | 1/2000 | Gilliland et al. | 372/38 |
| RE36,820 | E | 8/2000 | McGinley et al. | 361/752 |
| 6,108,114 | A | 8/2000 | Gilliland et al. | 359/187 |
| 6,160,647 | A | 12/2000 | Gilliland et al. | 359/110 |
| 6,206,582 | B1 * | 3/2001 | Gilliland | 385/92 |
| 6,220,873 | B1 * | 4/2001 | Samela et al. | 439/76.1 |
| 6,267,606 | B1 * | 7/2001 | Poplawski et al. | 439/92 |
| 6,350,063 | B1 * | 2/2002 | Gilliland et al. | 385/88 |
| 6,430,053 | B1 | 8/2002 | Peterson et al. | 361/728 |
| 6,551,117 | B2 | 4/2003 | Poplawski et al. | 439/92 |
| 6,570,768 | B2 | 5/2003 | Medina | 361/747 |
| 6,607,307 | B2 | 8/2003 | Gilliland et al. | 385/88 |
| 6,711,189 | B1 | 3/2004 | Gilliland et al. | 372/38.02 |
| 6,778,399 | B2 | 8/2004 | Medina et al. | 361/729 |
| 6,874,953 | B2 * | 4/2005 | Dair et al. | 385/92 |
| 2003/0236019 | A1 * | 12/2003 | Hanley et al. | 439/372 |

OTHER PUBLICATIONS

Small Form-Factor Pluggable (SFP) Transceiver Multiscore Agreement (MSA), dated Sep. 14, 2000.

* cited by examiner

*Primary Examiner*—Thao X. Le
*Assistant Examiner*—Xiaoliang Chen
(74) *Attorney, Agent, or Firm*—Karl D. Kovach

(57) ABSTRACT

The device includes a housing, a printed circuit board, a first optical subassembly, a second optical subassembly, and a lever. The device is pluggable to a host structure. The housing has a channel and ground spring fingers. The printed circuit board has contact traces and is mounted to the housing. The first and second optical subassemblies are mounted to the printed circuit board. The lever is rotatably mounted to the housing. The lever includes a rotatably mounted portion, a free end, and an actuation surface for actuation by a user. The free end of the lever forms a hook. In a locked position of the device to the host structure, the ground spring fingers contact and make electrical contact with a faceplate of the host structure, and the hook engages a slot of a circuit board of the host structure.

20 Claims, 9 Drawing Sheets

CAGELESS, PLUGGABLE OPTOELECTRONIC DEVICE

BACKGROUND OF THE INVENTION

1. Field of the Invention

The present invention pertains to optoelectronic devices. The invention more particularly concerns a pluggable, optoelectronic device which does not plug into a cage.

2. Discussion of the Background

Optoelectronic transceivers are utilized to interconnect circuit cards of communication links and other electronic modules or assemblies. Various international and industry standards define the type of connectors used to interface computers to external communication devices such as modems, network interfaces, and other transceivers. A well-known type of transceiver module developed by an industry consortium and known as a Gigabit Interface Converter (GBIC) provides an interface between a computer and an Ethernet, Fibre Channel, or other data communication environment. Optoelectronic devices are disclosed in U.S. Pat. Nos. 5,717,533; 5,734,558; 5,864,468; 5,879,173; 6,570,768; and Re 36,820, all of which are hereby incorporated herein by reference. Electronics associated with the optoelectronic devices are disclosed in U.S. Pat. Nos. 5,812,582; 5,812,717; 6,108,114; 6,160,647; 6,607,307; 6,711,189; and Re 36,491, all of which are hereby incorporated herein by reference.

Miniaturization of these transceivers is desirable in order to increase the port density associated with the network connection (switch boxes, cabling patch panels, wiring closets, computer I/O, etc.). Various standards are known that define form factors for miniaturized electronic devices, such as the Small Form-Factor Pluggable (SFP) standard that specifies an enclosure 9.8 millimeters in height by 13.5 millimeters in width and having a minimum of 20 electrical input/output connections. The specific standards for SFP transceivers are set forth in the "Small Form-Factor Pluggable (SFP) Transceiver Multisource Agreement (MSA)," dated Sep. 14, 2000, which is hereby incorporated herein by reference. Such optoelectronic devices are disclosed in U.S. Pat. Nos. 6,430,053; 6,551,117; 6,570,768; 6,778,399, all of which are hereby incorporated herein by reference.

Each SFP transceiver is plugged into a cage or receptacle of the host structure. The case is mounted to a circuit board of the host structure. The cage is designed to limit the propagation of electromagnetic radiation. The cage must be attached to the circuit board of the host structure. Also, the cage takes up space on the circuit board of the host structure.

Typically, release mechanisms for transceiver modules rely on an ejection spring of the cage of the host structure to push the module out of the host structure when the module is released. If the ejection spring of the host structure is weak or defective, the module may not be ejected far enough to enable an operator to remove the module by hand. Furthermore, if the module is jammed or not properly located within the host structure, or there is excessive friction between the module and the host structure, the ejection spring of the host structure may be unable to properly eject the module.

Accordingly, there is a need for an optoelectronic device which does not utilize much of the area of a circuit board of the host structure, minimizes the number of parts needed so as to use the optoelectronic device, and is easily removable from a host structure by an operator.

SUMMARY OF THE INVENTION

It is an object of the invention to provide a device which is easily removable from a host structure by an operator or user.

It is another object of the invention to provide a device which minimizes the amount of area that is occupied on the circuit board of the host structure by the device.

It is still further an object of the invention to provide a device which minimizes the number of piece parts that are required to enable the device operate.

In one form of the invention the device includes a housing, a printed circuit board, a first optical subassembly, a second optical subassembly, and a lever. The device is pluggable to a host structure, where the host structure includes a circuit board, a faceplate, and a slot formed in the circuit board. The housing has a channel and ground spring fingers. The printed circuit board is mounted to the housing, and the printed circuit board has contact traces. The first and second optical subassemblies are mounted to the printed circuit board. The lever is rotatably mounted to the housing. The lever includes a rotatably mounted portion, a free end, and an actuation surface for actuation by a user. The free end of the lever forms a hook. In a locked position of the device to the host structure, the ground spring fingers contact and make electrical contact with the faceplate of the host structure, and the hook engages the slot of the circuit board of the host structure.

In another form of the invention the device includes a housing, a printed circuit board, a first optical subassembly, a second optical subassembly, an upper cover, a lower cover, and a lever. The device is pluggable to a host structure, where the host structure includes a circuit board, a faceplate, and a slot formed in the circuit board. The housing has a stepped portion. The printed circuit board is mounted to the housing, and the printed circuit board has contact traces. The first and second optical subassemblies are mounted to the printed circuit board. The lever is rotatably mounted to the housing. The lever includes a rotatably mounted portion, a free end, and an actuation surface for actuation by a user. The free end of the lever forms a hook. The upper cover is attached to the housing and includes a first set of ground spring fingers. The lower cover is attached to the housing. The lower cover includes a stepped portion. Together, the stepped portion of the lower cover and the stepped portion of the housing form a channel. The lower cover includes a second set of ground spring fingers, and an elastically deformable portion. The first and second sets of ground spring fingers are adapted for contacting and grounding to the faceplate of the host structure. The elastically deformable section of the lower cover contacts the lever between the actuation surface of the lever and the rotatably mounted portion of the lever. In a locked position of the device to the host structure, the first and second sets of ground spring fingers contact and make electrical contact with the faceplate of the host structure, the hook engages the slot of the circuit board of the host structure, and the housing is supported by a portion of the circuit board of the host structure positioned in the channel.

In still yet another form of the invention the device includes a housing, a printed circuit board, a first optical subassembly, a second optical subassembly, an upper cover, a lower cover, and a lever. The device is pluggable to a host structure, where the host structure includes a circuit board, a faceplate, and a slot formed in the circuit board. The housing has a stepped portion, and a pocket. The printed circuit board is mounted to the housing, and the printed circuit board has contact traces. The first and second optical subassemblies are mounted to the printed circuit board. The lever is rotatably mounted to the housing. The lever includes a rotatably mounted portion, a free end, and an actuation surface for actuation by a user. The free end of the lever forms a hook. The upper cover is attached to the housing and includes a first set of ground spring fingers. The lower cover is attached to the housing. The lower cover includes a stepped portion. Together, the stepped portion of the lower cover and the stepped portion of the housing form a channel. The lower cover includes a second set of ground spring fingers, and an elastically deformable portion. The first and second sets of ground spring fingers are adapted for contacting and grounding to the faceplate of the host structure. The elastically deformable section of the lower cover contacts the lever between the actuation surface of the lever and the rotatably mounted portion of the lever. When the device is initially introduced into the host structure, a portion of the circuit board of the host structure enters the channel of the device and contacts the hook. The contact between the hook and the circuit board causes the lever to roatate and the hook moves into the pocket of the housing. The rotated lever causes the elastically deformable section of the lower cover to deflect. The deflected elastically deformable section of the lower cover urges the lever back toward an un-rotated position. And, upon further insertion of the device into the host structure, the hook lines up with the slot of the circuit board of the host device, and due to the urging of the deflected elastically deformable section of the lower cover, the hook enters the slot so as to lock the device to the host structure. When the device is fully removed from the host structure, contact edges of the first set of ground spring fingers and contact edges of the second set of ground spring fingers are separated from a contact edge of the hook by a first distance, and a contact edge of the slot is separated from a contact surface of the faceplate by a second distance. The second distance is greater than the first distance.

Thus, the invention achieves the objectives set forth above. The invention provides a device which is able to be easily removed from a host structure, does not take up as much area on a circuit board of a host structure as compared to other optoelectronic devices, and does not require a cage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
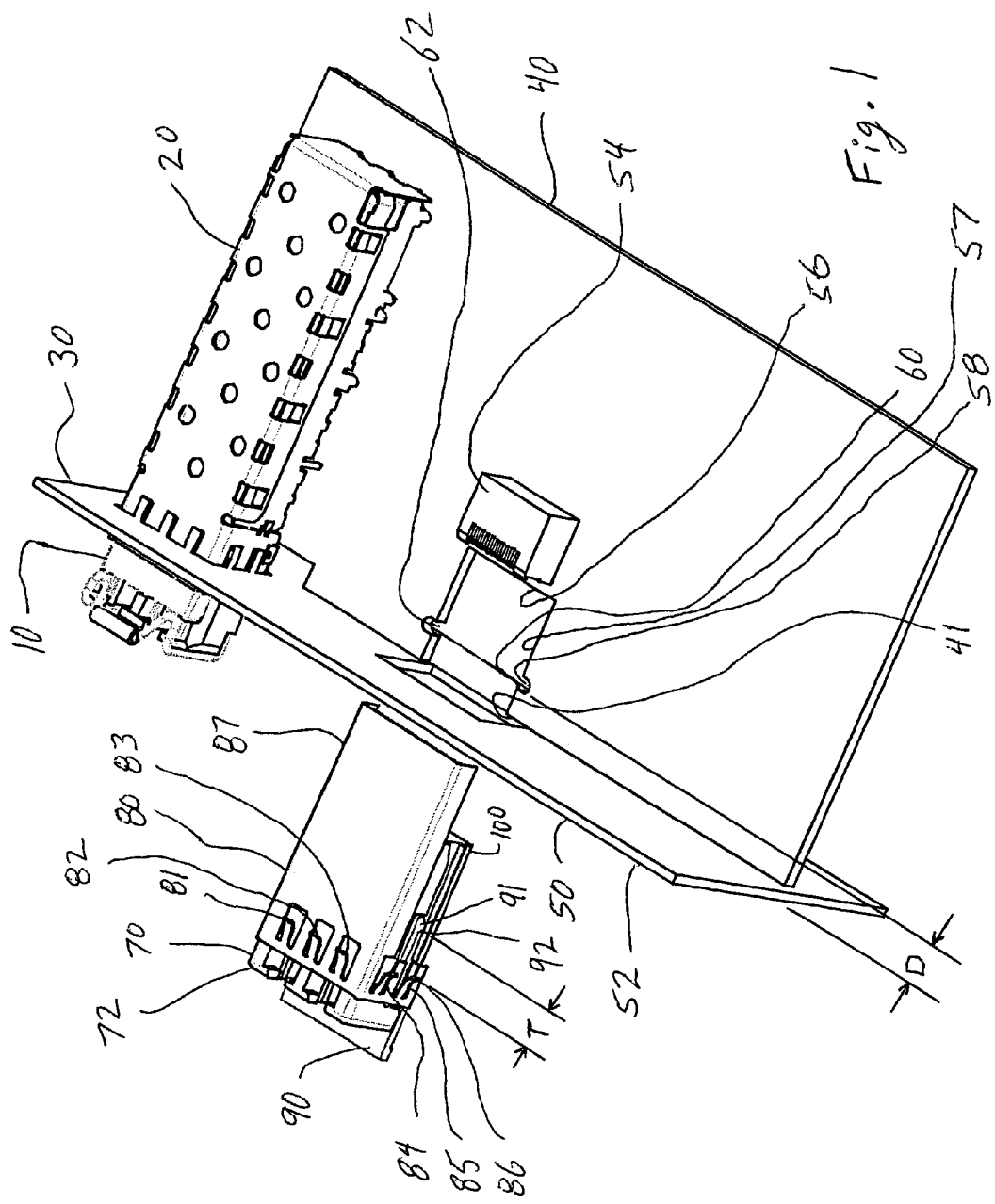
FIG. 1 is a perspective view of an optoelectronic device, a SFP, and a portion of a host structure.

Referring now to the drawings, wherein like reference numerals designate identical or corresponding parts throughout the several views, and more particularly to FIGS. 1-10 thereof, an embodiment of the present invention is displayed therein.

FIG. 1 is a perspective view of an embodiment of the optoelectronic device 70. As a comparison the SFP 10, and SFP cage 20 are also shown. The optoelectronic device 70 of the embodiment has a much shorter length as compared to the SFP 10. Furthermore, the optoelectronic device 70 does not require a cage. The optoelectronic device 70 includes a housing 72, an upper cover 80, a lower cover 100, and a lever 90. The upper cover 80 includes a first set of spring ground fingers 81, 82, 83, 84, 85, and a contact trace protector 87. Each spring ground finger 81, 82, 83, 84, 85 has a contact edge. As an example, spring ground finger 85 has a contact edge 86. The device 70 plugs into a host structure 30. The host structure 30 includes a faceplate 50, and a circuit board 40. The faceplate 50 of the host structure 30 includes a contact surface 52. The circuit board 40 includes a connector 54, and a cut-out 56. The cut-out 56 includes slots 58, 62, and each slot includes a contact edge 60 as shown for slot 58. The cut-out 56 also includes a portion 57 of the circuit board that acts as a rail for the device 70. The connector 54 is the same as the connector that is utilized with the SFP 10. The lever 90 includes a free end forming a hook 91. The hook 91 has a contact edge 92. A first distance is denoted as the alphabetic character T and is defined as the distance between the contact edge 86 of the ground spring finger 85 of the first set of ground spring fingers 81, 82, 83, 84, 85 and the contact edge 92 of the hook 91 when the device 70 is not inserted in the host structure 30. A second distance is denoted as the alphabetic character D and is defined as the distance between the contact edge 60 of the slot 58 and the contact surface 52 of the faceplate 30. The second distance D is greater than the first distance T.

Figure 2:
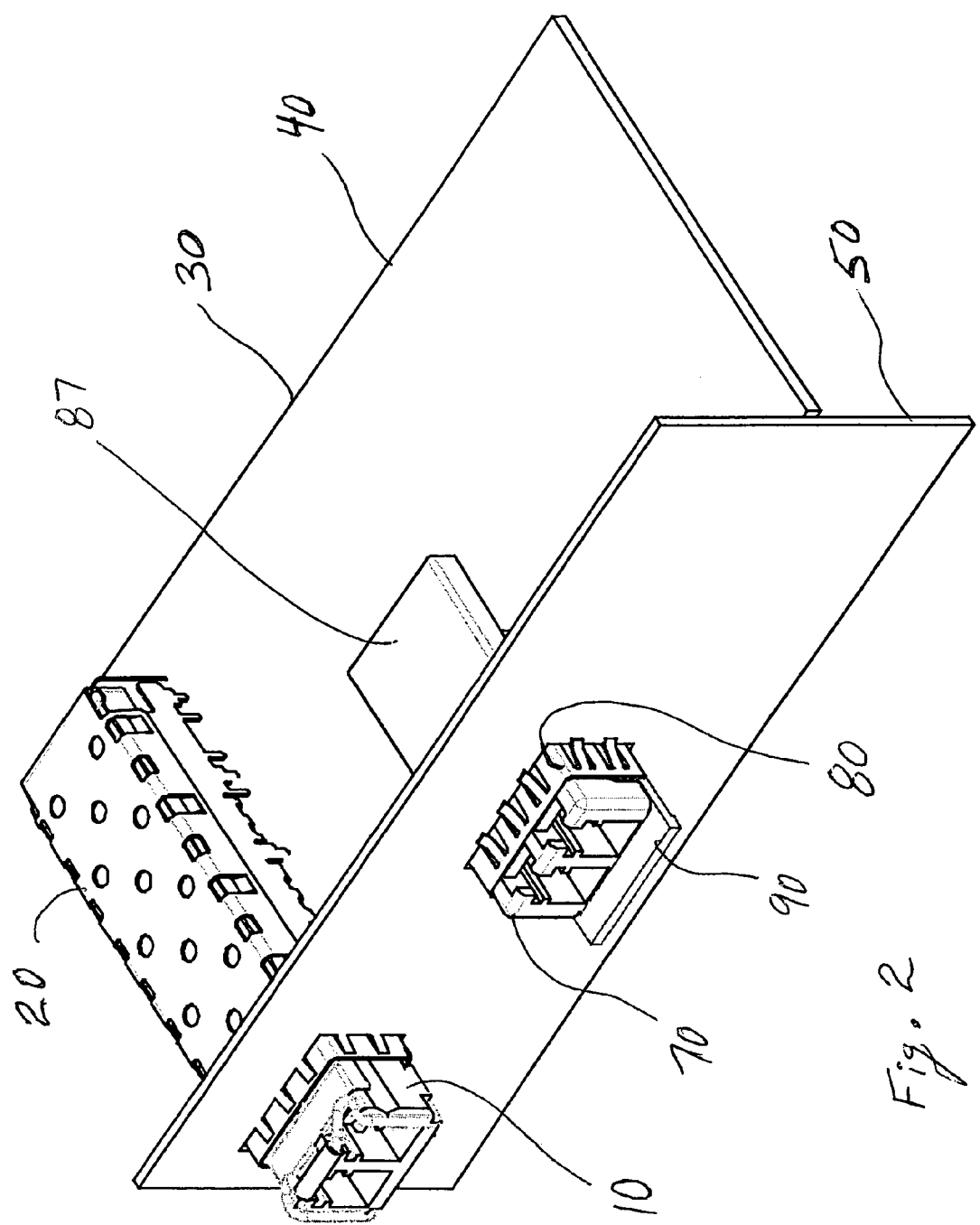
FIG. 2 is a perspective view of the optoelectronic device of FIG. 1 plugged into the host structure where the view is taken from a different angle.

FIG. 2 is a perspective view of the device 70 plugged into the host structure 30. The lever 90 and the upper cover 80 of the device 70 are shown. The host structure 30 includes the circuit board 40 and the faceplate 50. As a means for comparison, the SFP 10 and its associated cage 20 are shown plugged into the host structure 30. When the device 70 is plugged into the host structure 30, the ground spring fingers 81, 82, 83, 84, 85 contact the faceplate 50 and the ground spring fingers 81, 82, 83, 84, 85 of the upper cover 80 become compressed or deflected. The energy stored by the deflection of the ground spring fingers 81, 82, 83, 84, 85 helps the device 70 be ejected from the host structure 30 when it is desired to remove the device 70 from the host structure 30.

Figure 3:
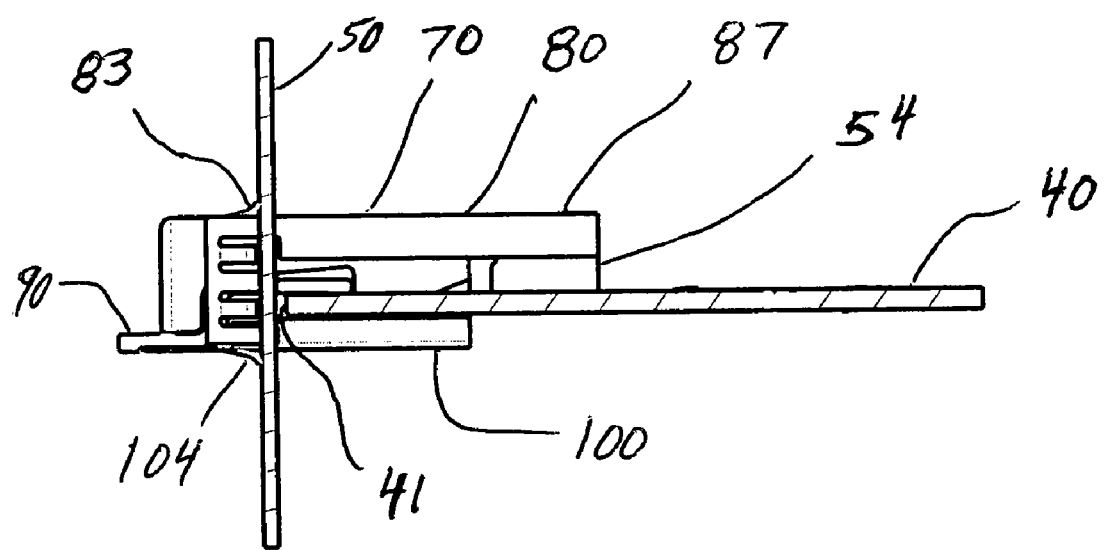
FIG. 3 is a side view of the optoelectronic device of FIG. 2.

FIG. 3 is a side view of the device 70 plugged into the host structure 30. The lever 90, the upper cover 80, and the lower cover 100 of the device 70 are shown. The lower cover 100 is shown to include a ground spring finger 104. Like the other ground spring fingers, the ground spring finger makes contact with and is grounded to the contact surface 52 of the faceplate 50. The upper cover 80 includes the contact trace protector 87, and ground spring finger 83. The faceplate 50, circuit board 40, and connector 54 of the host structure 30 are shown. The upper cover 80 and the lower cover 100 can be attached to the housing 72 by any conventional engineering means such as friction fit, adhesives, fasteners, and welding. The upper cover 80, he lower cover 100, the housing 72, and the faceplate 50 are constructed of conductive material so that electrical ground can be achieved among the components. Such material can be a metallic material.

Figure 4:
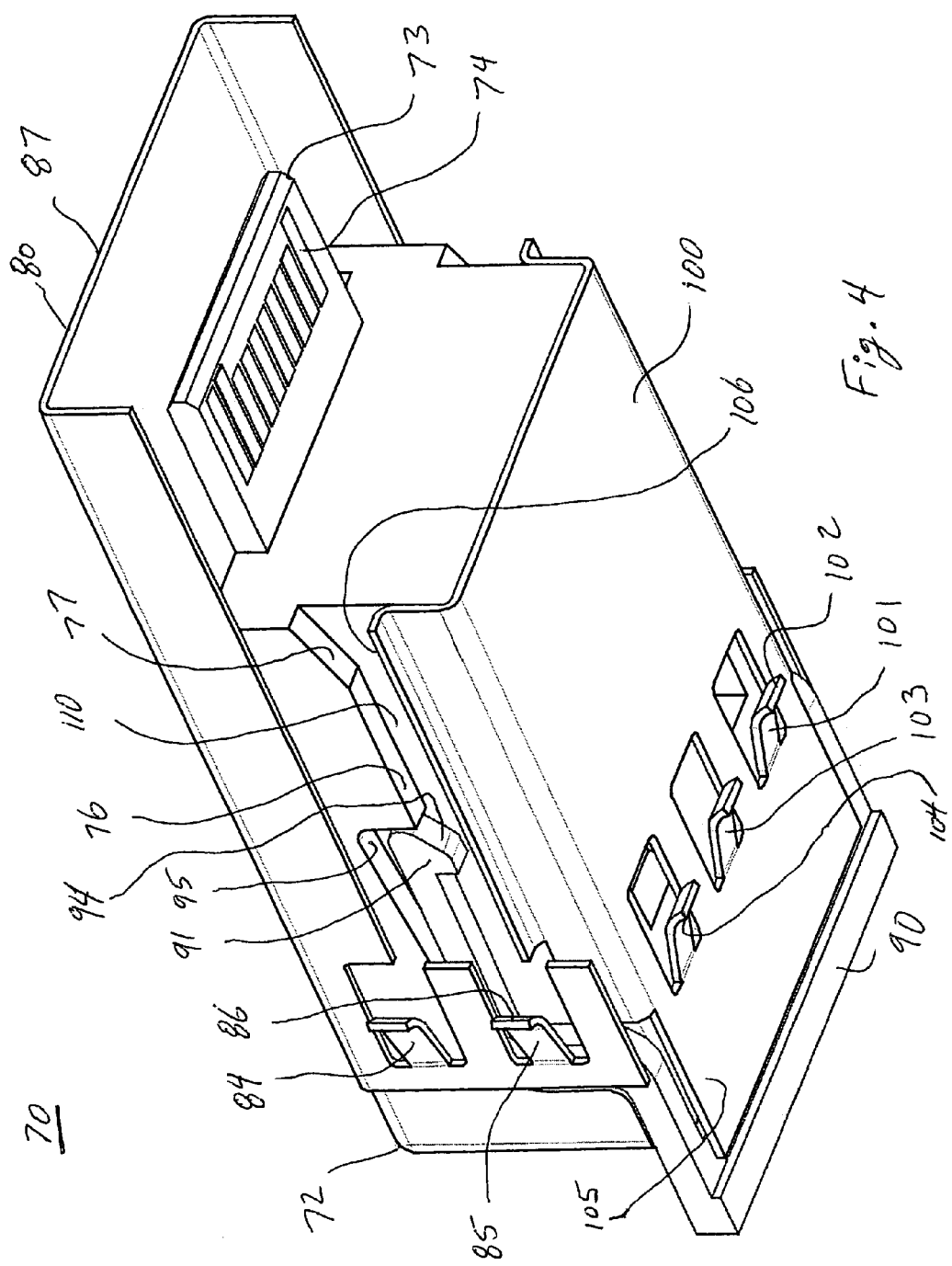
FIG. 4 is a perspective view of the optoelectronic device.

FIG. 4 is a perspective view of the device 70. A printed circuit board 73 is mounted in the housing 72. The lever 90 includes the hook 91 at the free end, and a ramp 94 associated with the hook 91. The printed circuit board 73 includes contact traces 74. The contact trace protector 87 of the upper cover 80 extends as far as the edge of the printed circuit board 73 so as to protect the contact traces 74 during shipping, storage, and handling of the device 70. The lower cover 100 includes a set of ground spring fingers 101, 103, 104, which function similar to the set of ground spring fingers associated with the upper cover 80. As an example, a contact edge of the ground spring finger 101 is identified. The lower cover 100 also includes an elastically deformable section 105. The elastically deformable section 105 contacts the lever 90 and urges the lever 90 towards a neutral position as shown in FIG. 4. The lower cover 100 also includes a stepped portion 106. The housing 72 includes a stepped portion 76. The stepped portion 106 of the lower cover 100 and the stepped portion 76 of the housing 72 form a channel 110 in which a portion 57 of the circuit board 40 acts as a rail and is introduced into the channel 110 when the device 70 is plugged into the host structure 30. When the device 70 is plugged into the host structure 30 the rail 57 helps to support the device 70. The housing 72 also includes an entrance chamfer 77, and a pocket 95. The upper cover and the lower cover can be integral with the housing 72, and, in such an embodiment, the channel is formed directly in the housing.

Figure 5:
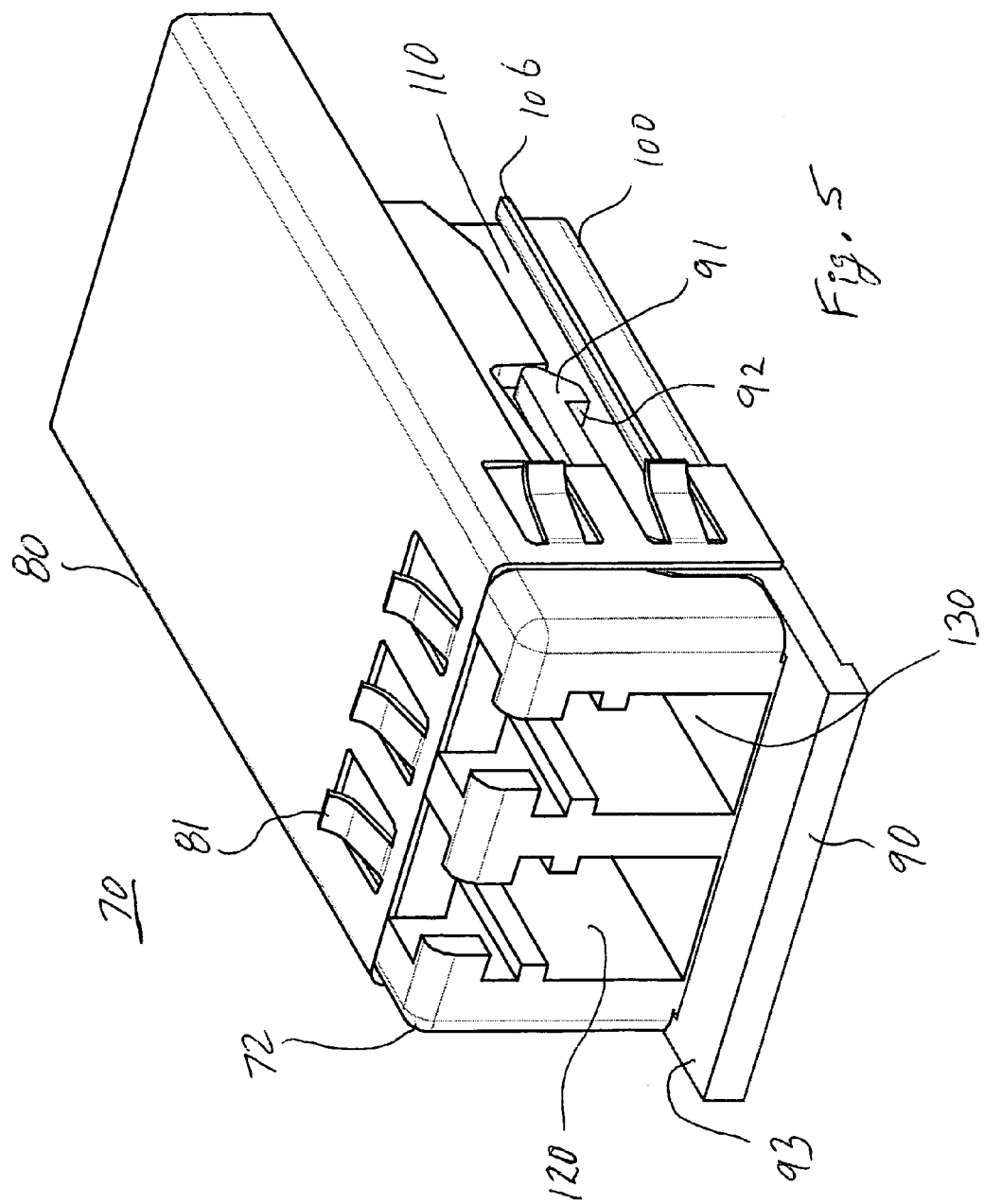
FIG. 5 is a perspective view of the optoelectronic device of FIG. 4 where the view is taken from a different angle.

FIG. 5 is a perspective view of the device 70 taken from another angle. The lever 90 includes an actuation surface 93, and the hook 91 is shown to have a contact edge 92. Also shown are a first receptacle 120, and a second receptacle 130 formed in the housing 72. The receptacles 120, 130 are adapted so as to accept fiber optic connectors that conform to the LC standard. However, any type of connector can be employed.

Figure 6:
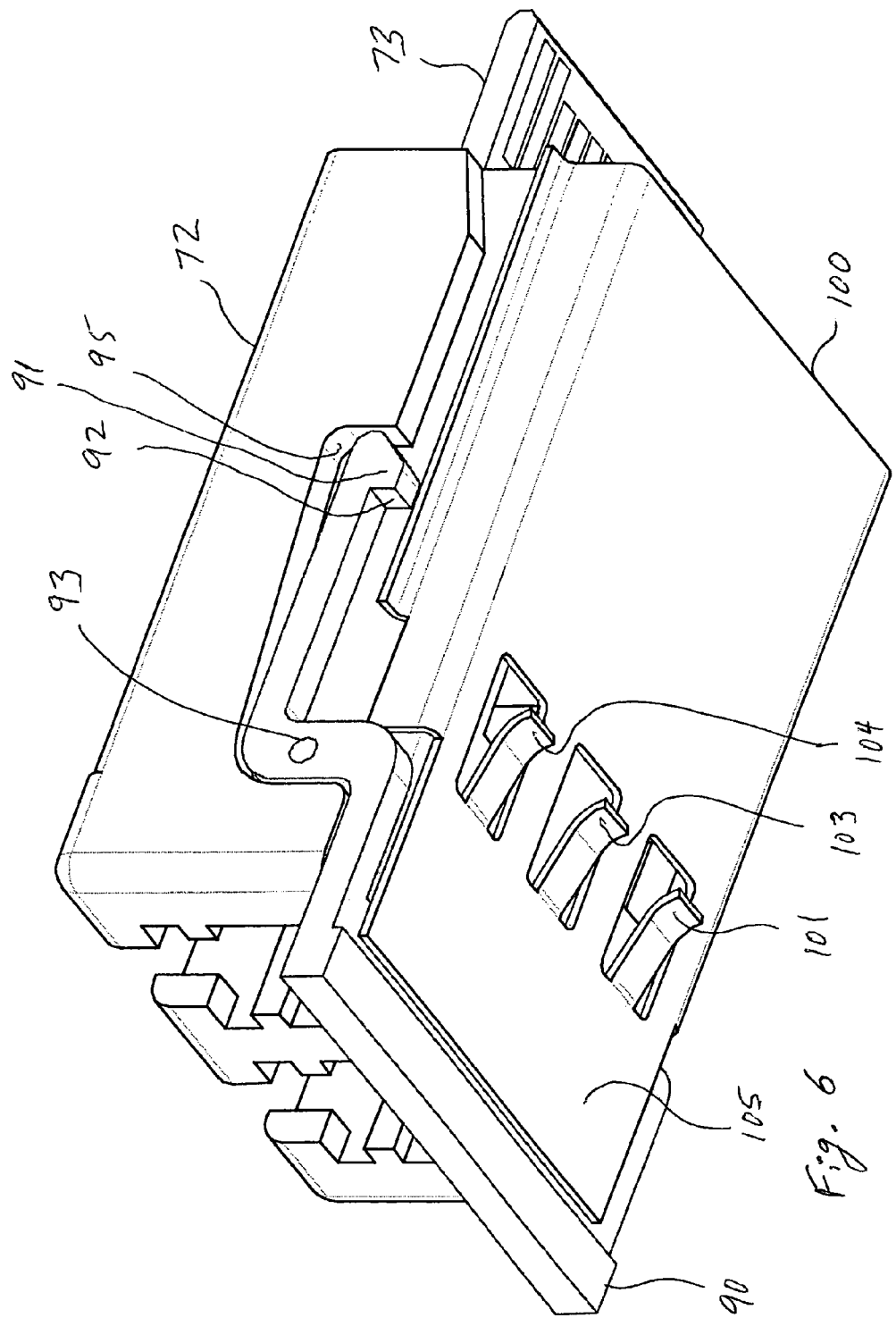
FIG. 6 is a perspective view of the optoelectronic device of FIG. 5 with the upper cover removed.

FIG. 6 is a perspective view of the device 70 with the upper cover 80 removed so as to more clearly show the lever 90. The lever 90 includes the hook 91, and a rotatably mounted portion 93 where the lever 90 is rotatably mounted to the housing 72. Also shown are features of the lower cover 100, the housing 72, and the printed circuit board 73.

Figure 7:
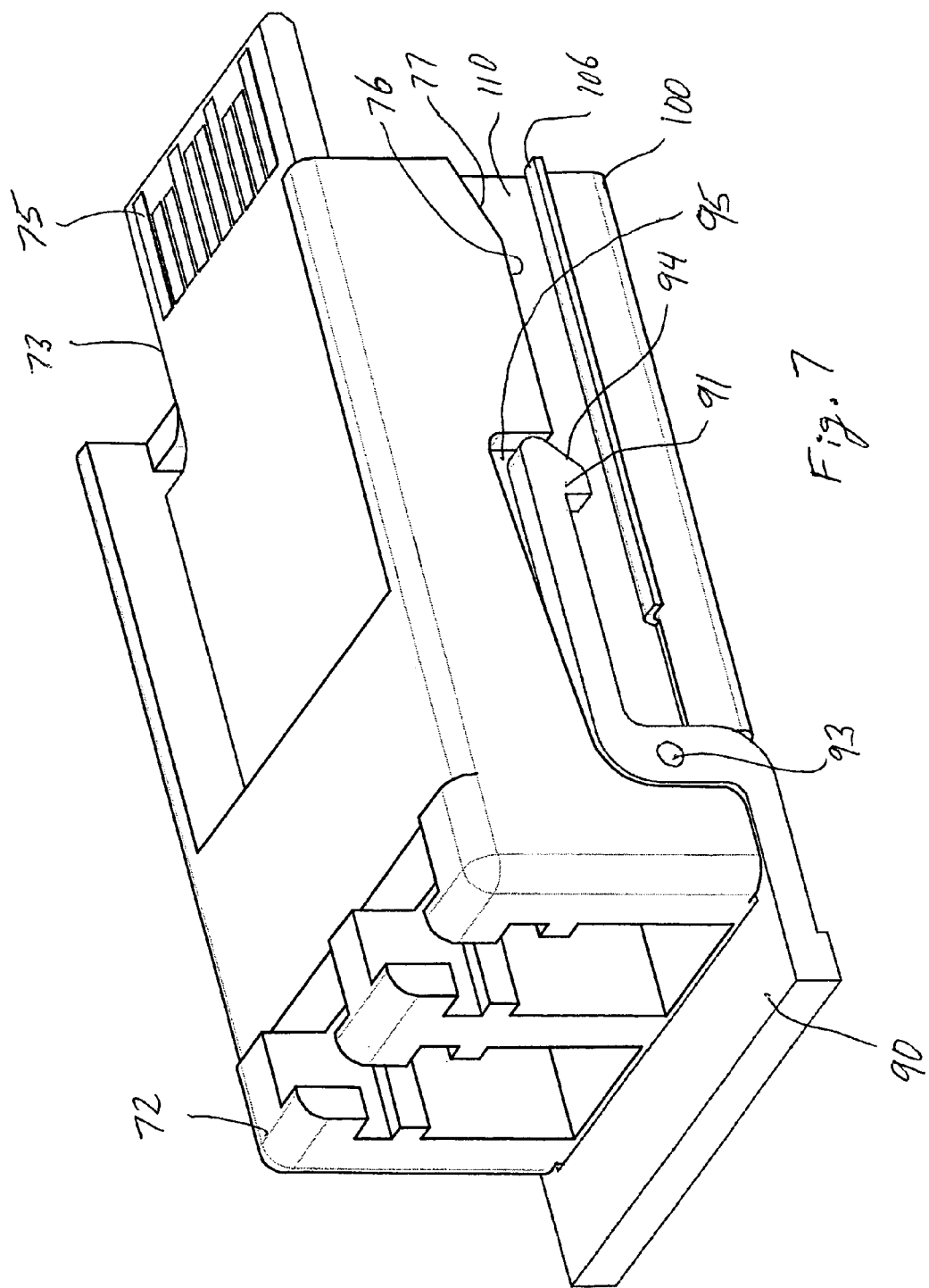
FIG. 7 is a perspective view of the optoelectronic device of FIG. 6 with the upper cover removed and where the perspective is taken from a different angle.

FIG. 7 is another perspective view of the device 70 with the upper cover 80 removed. Contract traces 75 are also shown on an upper surface of the printed circuit board. Details of the channel 110 are also shown.

Figure 8:
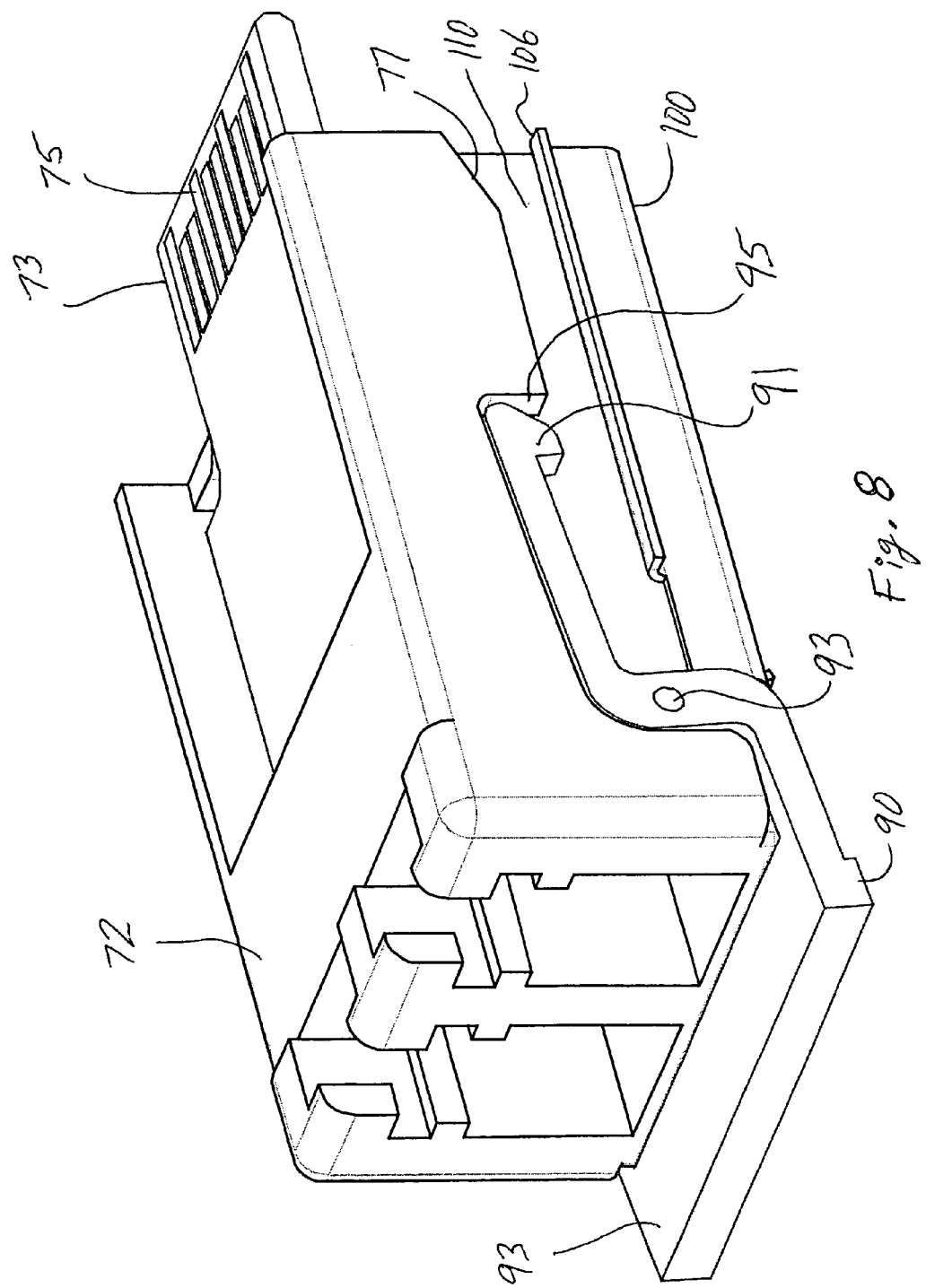
FIG. 8 is a perspective view of the optoelectronic device of FIG. 7 with the cover removed and where the lever is in a rotated position.

FIG. 8 is a perspective view of the device 70 with the upper cover 80 removed so as to show the position of the lever 90 when the lever 90 is rotated. In the rotated position, the hook 91 of the lever 90 is rotated into the pocket 95 formed in the housing 72. Also, the elastically deformable section 105 of the lower cover 100 contact the lever 90 on a side opposite the actuation surface 93 between the actuation surface 93 and the rotatably mounted portion 93. The lever 90 of the device 70 is in the rotated position when the device is introduced into the host structure 30 before the hooks 91 have engaged the slots of the circuit board 40, and when the a user or operator depress the actuation surface 93 of the lever 90 so as to deflect the elastically deformable section 105 of the lower cover 100 thus allowing the hook 91 to disengage from the slots 58, 62. Hooks 91 are on both side of the housing 72, but only one is shown in the perspective of the disclosed figure.

Figure 9:
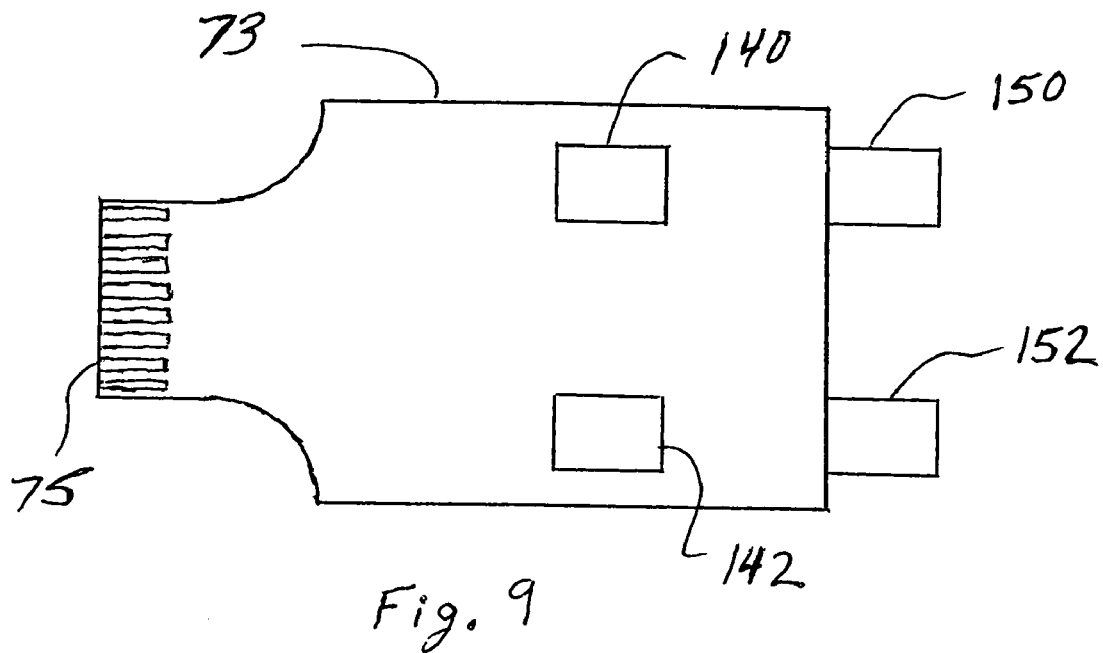
FIG. 9 is a top view of a schematic of the printed circuit board of the optoelectronic device.

FIG. 9 is a schematic of the printed circuit board 73, and of a first optical subassembly 150, and a second optical subassembly 152. The first optical subassembly 140 can be a transmitting optical subassembly or a receiving optical subassembly. The second optical subassembly 150 can be a transmitting optical subassembly or a receiving optical subassembly. Thus, the device 70 can be a transceiver in one embodiment, a dual transmitting device in another embodiment, and a dual receiving device in yet another embodiment. Also shown are electric signal conditioning circuitry 140 for the first optical subassembly 150 and electric signal conditioning circuitry 142 for the second optical subassembly 152. If the first optical subassembly 150 is a transmitting device, then the electronic signal conditioning circuitry 140 will include a laser driver. If the first optical subassembly 150 is a receiving device, then the electronic signal conditioning circuitry 140 will include an amplifier. If the second optical subassembly 152 is a transmitting device, then the electronic signal conditioning circuitry 142 will include a laser driver. If the second optical subassembly 152 is a receiving device, then the electronic signal conditioning circuitry 142 will include an amplifier. Furthermore, the contact traces 75 are disclosed.

Figure 10:
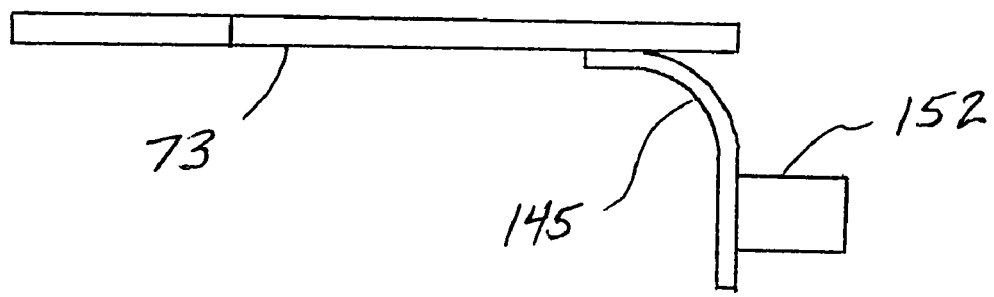
FIG. 10 is a side view of the schematic of the printed circuit board of the optoelectronic device of FIG. 9.

FIG. 10 is a side view of the schematic of the printed circuit board 73. The first and second optical subassemblies 150, 152 are attached to the printed circuit board 73 via conductive flex circuitry 145. The first optical subassembly 150 is in optical communication with the second receptacle 130, and the second optical subassembly 152 is in optical communication with the first receptacle 120.

In practice, when the device 70 is to be plugged into the host structure 30, the device 70 is in the position as shown in FIGS. 1, 4, and 5, and the lever 90 is in the position as shown in FIGS. 5, and 6. As the device 70 is introduced into the host device 30, an edge 41 of the circuit board 40 enters an entrance area defined by the channel 110 and the entrance chamfer 77. As the device 70 is further introduced into the host structure 30, a portion 57 of the circuit board 40 becomes trapped in the channel 110. As the device 70 is yet further introduced into the host structure 30, the edge 41 contacts the ramp 94 of the hook 91 thus causing the lever 90 to rotate with further insertion of the device 70. Once the edge 41 passes the ramp 94 of the hook 91, the hook 91 occupies the space defined by the pocket 95 of the housing 72 as shown in FIG. 8. As the device 70 is still further introduced into the host device 30, the contact edges of the first and second sets of ground spring fingers contact the contact surface 52 of the faceplate 50 and become compressed with further insertion. Finally, with just a little more insertion, the contact edge 92 of the hook 91 goes past the contact edge 60 of the slot 58 so that the energy stored in the elastically deformable portion 105 of the lower cover 100 is released and the hook 91 enters the slot 62 and the contact edge 92 of the hook 91 contact the contact edge 60 of the slot 58, thus the lever 90 has returned to the non-rotated position, and the elastically deformable portion 105 returns to the non-deflected position, and thus the device 70 is in a locked position.

In practice, when the device 70 is to be removed from the host structure 30, the user presses down on the actuation surface 93 of the lever 90 so as to overcome the resistance provided by the elastically deformable portion 105 of the lower cover 100. Once the lever has been rotated far enough, the contact edge 92 of the hook and the contact edge 60 of the slot 58 no longer make contact and the hook 91 has entered the pocket 95, at such a position no mechanical restraints keep the device 70 in the host structure 30. At this position, the energy stored in the compressed ground spring fingers of the first and second set of ground spring fingers is released and the device 70 is ejected or kicked-out or away from the host structure 30. If need be, the user or operator can then grasp hold of the lever 90 at the end where the actuation surface 93 surface exists and pull the device 70 out of the host structure 30.

The device achieves the goals of eliminating the traditional cage that is mounted to the circuit board 40 of the host structure 30, of eliminating part count and inventory cost by eliminating the cage, increasing the usable space available on the circuit board 40 by eliminating the cage, and increasing the space above the circuit board 40 since the device 70 is mounted in the cut-out 56 of the circuit board 40. Furthermore, the first and second sets of ground spring fingers of the upper and lower covers 80, 100 provide the benefit of the traditional cage. Additionally, the first and second sets of ground spring fingers act as the kick-out mechanism that was traditionally found in the cage.

Obviously, numerous modifications and variations of the present invention are possible in light of the above teachings. It is therefore to be understood that within the scope of appended claims, the invention may be practiced otherwise than as specifically described herein.

The invention claimed is:

1. A device which is pluggable to a host structure, the host structure having a circuit board, a faceplate, and a slot formed in the circuit board, the device comprising:
   a housing having a channel and ground spring fingers;
   a printed circuit board mounted to the housing, the printed circuit board having contact traces;
   a first optical subassembly attached to the printed circuit board;
   a second optical subassembly attached to the printed circuit board;
   a lever rotatably mounted to the housing, the lever having a rotatably mounted portion, a free end, and an actuation surface for actuation by a user, and the free end forming a hook, and wherein,
   in a locked position of the device with the host structure, the ground spring fingers contact and make an electrical connection with the faceplate of the host structure, and the hook engages the slot of the circuit board of the host structure.

2. A device according to claim 1 wherein the first optical subassembly is a transmitting optical subassembly.

3. A device according to claim 2 wherein the second optical subassembly is a receiving optical subassembly.

4. A device according to claim 2 wherein the second optical subassembly is a transmitting optical subassembly.

5. A device according to claim 1 wherein the first optical subassembly is a receiving optical subassembly.

6. A device according to claim 5 wherein the second optical subassembly is a receiving optical subassembly.

7. A device which is pluggable to a host structure, the host structure having a circuit board, a faceplate, and a slot formed in the circuit board, the device comprising:
   a housing having a stepped portion;
   a printed circuit board mounted to the housing, the printed circuit board having contact traces;
   a first optical subassembly attached to the printed circuit board;
   a second optical subassembly attached to the printed circuit board;
   an upper cover attached to the housing, the upper cover having a first set of ground spring fingers adapted for contacting and grounding to the faceplate of the host structure;
   a lever rotatably mounted to the housing, the lever having a rotatably mounted portion, a free end, and an actuation surface for actuation by a user, and the free end forming a hook;
   a lower cover attached to the housing, the lower cover having a second set of ground spring fingers, an elastically deformable section contacting the lever between the actuation surface of the lever and the rotatably mounted portion of the lever, and a stepped portion, the second set of ground spring fingers adapted for contacting and grounding to the faceplate of the host device, and wherein the stepped portion of the lower cover and the stepped portion of the housing form a channel, and wherein,
   in a locked position of the device with the host structure, the first set of ground spring fingers and the second set of ground spring fingers contact and make an electrical connection with the faceplate of the host structure, the hook engages the slot of the circuit board of the host structure, and the housing is supported by a portion of the circuit board of the host structure positioned in the channel.

8. A device according to claim 7 wherein the first optical subassembly is a transmitting optical subassembly.

9. A device according to claim 8 wherein the second optical subassembly is a receiving optical subassembly.

10. A device according to claim 8 wherein the second optical subassembly is a transmitting optical subassembly.

11. A device according to claim 7 wherein the first optical subassembly is a receiving optical subassembly.

12. A device according to claim 11 wherein the second optical subassembly is a receiving optical subassembly.

13. A device which is pluggable to a host structure, the host structure having a circuit board, a faceplate, and a slot formed in the circuit board, the device comprising:
   a housing having a stepped portion, and a pocket;
   a printed circuit board mounted to the housing, the printed circuit board having contact traces;
   a first optical subassembly attached to the printed circuit board;
   a second optical subassembly attached to the printed circuit board;
   an upper cover attached to the housing, the upper cover having a first set of ground spring fingers adapted for contacting and grounding to the faceplate of the host structure;
   a lever rotatably mounted to the housing, the lever having a rotatably mounted portion, a free end, and an actuation surface for actuation by a user, and the free end forming a hook;
   a lower cover attached to the housing, the lower cover having a second set of ground spring fingers, an elastically deformable section contacting the lever between the actuation surface of the lever and the rotatably mounted portion of the lever, and a stepped portion, and the second set of ground spring fingers adapted for contacting and grounding to the faceplate of the host device, and wherein the stepped portion of the lower cover and the stepped portion of the housing form a channel, and wherein,
   when the device is initially introduced into the host structure, a portion of the circuit board of the host structure enters the channel of the device and contacts the hook, the contact between the hook and the circuit board causes the lever to rotate and the hook moves into the pocket of the housing, and the rotated lever causes the elastically deformable section of the lower cover to deflect, the deflected elastically deformable section of the lower cover urges the lever back toward an unrotated position, and wherein, upon further insertion of the device into the host structure, the hook lines up with the slot of the circuit board of the host device, and due to the urging of the deflected elastically deformable section of the lower cover, the hook enters the slot so as to lock the device to the host structure, and wherein, when the device is fully removed from the host structure, contact edges of the first set of ground spring fingers and contact edges of the second set of ground spring fingers are separated from a contact edge of the hook by a first distance, and a contact edge of the slot is separated from a contact surface of the faceplate by a second distance, and wherein the second distance is greater than the first distance.

14. A device according to claim 13 wherein the first optical subassembly is a transmitting optical subassembly.

15. A device according to claim 14 wherein the second optical subassembly is a receiving optical subassembly.

16. A device according to claim 14 wherein the second optical subassembly is a transmitting optical subassembly.

17. A device according to claim 13 wherein the first optical subassembly is a receiving optical subassembly.

18. A device according to claim 17 wherein the second optical subassembly is a receiving optical subassembly.

19. A device according to claim 18 wherein the housing is made of a metallic material.

20. A device according to claim 19 wherein the lower cover is a made of a metallic material.

* * * * *